(12) United States Patent
Fitzsimons (10) Patent No.: US 12,212,535 B2
(45) Date of Patent: Jan. 28, 2025

(54) SYSTEM OF ADVANCED FEATURES FOR EMAIL

(71) Applicant: James McHarg Fitzsimons, Sydney (AU)

(72) Inventor: James McHarg Fitzsimons, Sydney (AU)

(*) Notice: Subject to any disclaimer, the term of this patent is extended or adjusted under 35 U.S.C. 154(b) by 0 days.

(21) Appl. No.: 15/467,066

(22) Filed: Mar. 23, 2017

(65) Prior Publication Data

US 2017/0279754 A1 Sep. 28, 2017

(51) Int. Cl.
*H04L 51/214* (2022.01)
*H04L 51/42* (2022.01)
*H04L 51/48* (2022.01)

(52) U.S. Cl.
CPC ............ *H04L 51/214* (2022.05); *H04L 51/42* (2022.05); *H04L 51/48* (2022.05)

(58) Field of Classification Search
CPC .......... H04L 51/14; H04L 51/22; H04L 51/28
See application file for complete search history.

(56) References Cited

U.S. PATENT DOCUMENTS

| | | | | |
|---|---|---|---|---|
| 10,841,266 B1* | 11/2020 | Jayaraman | ............ | H04L 51/42 |
| 2002/0095454 A1* | 7/2002 | Reed | ............ | H04L 67/5682 709/212 |
| 2002/0099775 A1* | 7/2002 | Gupta | ............ | G06Q 10/107 709/205 |
| 2002/0129275 A1* | 9/2002 | Decuir | ............ | H04L 63/0428 726/28 |
| 2003/0233410 A1* | 12/2003 | Gusler | ............ | G06Q 10/107 709/206 |
| 2005/0198579 A1* | 9/2005 | Perepa | ............ | G06Q 10/107 709/200 |
| 2006/0026438 A1* | 2/2006 | Stern | ............ | H04L 51/48 715/752 |
| 2008/0005355 A1* | 1/2008 | Craft | ............ | H04L 51/48 709/245 |
| 2008/0010348 A1* | 1/2008 | Dawson | ............ | H04L 63/0421 709/206 |
| 2008/0189622 A1* | 8/2008 | Sanchez | ............ | G06Q 10/06 715/752 |
| 2008/0208988 A1* | 8/2008 | Khouri | ............ | H04L 51/216 709/206 |
| 2008/0276180 A1* | 11/2008 | Zacarias | ............ | G06Q 30/02 715/739 |
| 2009/0138559 A1* | 5/2009 | Jones | ............ | G06Q 10/00 709/206 |
| 2009/0172109 A1* | 7/2009 | Weir | ............ | H04L 51/216 709/206 |

(Continued)

*Primary Examiner* — Dhairya A Patel
(74) *Attorney, Agent, or Firm* — The Law Office of Kevin McDermott, P.L.L.C.

(57) ABSTRACT

An email system incorporating a disable "reply to all" functionality; said system presenting an email preparation screen including options to "send" the contents of an email template and "reply to all" to an email previously received and displayed; the system permitting a user to invoke an email preparation template which includes at least a Sender field, a Cc field, and a Subject field; said email preparation screen further including a "disable reply to all" option which, if invoked by a user, disables the "reply to all" option on that screen for so long as that option remains invoked.

12 Claims, 4 Drawing Sheets

(56) References Cited

U.S. PATENT DOCUMENTS

| | | | |
|---|---|---|---|
| 2009/0214034 A1* | 8/2009 | Mehrotra | G06Q 10/107 |
| | | | 380/255 |
| 2010/0070591 A1* | 3/2010 | Steuer | G06Q 10/107 |
| | | | 709/206 |
| 2010/0070592 A1* | 3/2010 | Steuer | H04L 51/216 |
| | | | 709/206 |
| 2010/0293475 A1* | 11/2010 | Nottingham | G06Q 10/107 |
| | | | 715/752 |
| 2011/0138479 A1* | 6/2011 | Jain | G06F 21/64 |
| | | | 726/28 |
| 2011/0265012 A1* | 10/2011 | Koopman | H04L 51/214 |
| | | | 715/752 |
| 2012/0110092 A1* | 5/2012 | Keohane | G06Q 10/107 |
| | | | 709/206 |
| 2013/0067227 A1* | 3/2013 | Derrick | H04L 63/0421 |
| | | | 713/168 |
| 2013/0198296 A1* | 8/2013 | Roy | G06Q 10/107 |
| | | | 709/206 |
| 2014/0330913 A1* | 11/2014 | Pascal | H04L 51/216 |
| | | | 709/206 |
| 2016/0057089 A1* | 2/2016 | Agrawal | H04L 51/216 |
| | | | 709/206 |
| 2021/0281586 A1* | 9/2021 | Rasmussen | H04L 63/1466 |
| 2024/0248941 A1* | 7/2024 | Marsh | G06F 16/9535 |
| 2024/0311889 A1* | 9/2024 | Levy | G06Q 30/0621 |

\* cited by examiner

SYSTEM OF ADVANCED FEATURES FOR EMAIL

TECHNICAL FIELD

The present invention relates to the field of email transmission and, more particularly, but not exclusively, to the transmission and reception of emails whereby access to and/or transmission of data associated with selected parties to the transmission is controlled. Control both on its face (displayed identity data) and behind the scenes (email address data) is contemplated so as to provide finer-grained control of transmission and on-transmission of emails than has hitherto been the case.

BACKGROUND OF THE INVENTION

Email is a well known, popular, form of communication.

Typically a sender can address an email to one or more "recipients" and copy the message to one or more other people—the "public recipients". A Sender may also BCC (a name derived from the previous technology—Blind Carbon Copy) to a person (BCC recipient") who sees details of the Sender and of the Public Recipients. Public Recipients do not know if anyone was sent a BCC when they receive the message from the Sender.

A little understood but significant problem within email systems is that if a person sends a BCC and the BCC Recipient uses the functionality commonly known as "Reply to All", then all the Public Recipients of the original email receive a reply as well as the Sender. This problem results in Public Recipients receiving a message that was sent by a BCC recipient using (either deliberately or inadvertently) "Reply to All" becoming aware for the first time that the BCC recipient was copied in originally. This can lead to embarrassing and complicated situations potentially with legal ramifications; if the Sender had wanted the Public Recipients to know that a BCC Recipient was receiving the message (s)he would have made the BCC Recipient a Public Recipient.

A potentially worse problem occurs if the Sender later wishes to forward the sent message to another recipient (the Forward Recipient). Happily for the Sender in this situation the Forward Recipient who does a "Reply to All" will only send a reply to the Sender. Unhappily for the Sender, however, the Forward Recipient will see the details of all the recipients of the original email—both Public Recipients and all of the BCC recipients.

Another common problem is that Senders often want to customize the same message for each recipient without having to copy and paste text between messages. The ability to automate the individualization of messages as they are sent is not currently supported by email clients. To achieve this using a standard email client the user must write a master email then copy and paste the main text of the email and then add customization for each email as they are written and sent. This process is long winded, complicated and time consuming.

Additionally in many business situations it is desirable to send the equivalent of a blind forward of a message, where the recipient sees that they are receiving a copy of an email that the sender has already sent to another person. In such situations it is sometimes desirable that the recipient does not see the email address of the person who was the recipient of the original email. It is also desirable that the blind forward recipient can only reply to or "reply to all" to the original sender and not inadvertently send a reply to the original recipient. It is further desirable that the Sender be able to set a default covering message to be sent to each BCC Recipient (such as "FYI") but that this can be customized where desirable. Typically a user in this situation would have to send the original email to a person, then go to their sent emails and forward a copy of the original email to the user. This approach introduces many steps, is complicated and time consuming (and has the disadvantage illuminated above that if there were any BCC recipients of the original message their identities will be disclosed unless the Sender goes to the trouble of manually removing the details.

The described invention is designed to address these issues.

SUMMARY OF INVENTION

Definitions

E-mail: In this specification e-mail is a form of electronic mail adapted to be sent from one digital device to another. It can run on any platform including, but not limited to, Exchange mail server from Microsoft, the Gmail platform from Google or the Whatsapp Mobile messaging platform.

Accordingly in one broad form of the invention there is provided a method of preparing an e-mail for forwarding to a forward addressed recipient at the same time as preparing the e-mail for sending the e-mail to a target addressed recipient; said method comprising preloading a target recipient field of an e-mail template with the e-mail address of the target addressed recipient; preloading a separate blind forward field of the e-mail template with the e-mail address of a forward recipient; whereby on causing the e-mail thus preloaded to be sent, the contents of the e-mail template are transmitted by e-mail to the target addressed recipient and at substantially the same time and as part of the same e-mail transmission operation the contents of the e-mail template are transmitted by e-mail to the forward recipient.

Accordingly in one broad form of the invention there is provided a processing device which implements a method of preparing an e-mail for forwarding to a forward addressed recipient at the same time as preparing the e-mail for sending the e-mail to a target addressed recipient; the processing device comprising at least a processor in communication with a memory and an input output device; said method comprising preloading into the memory a target recipient field of an e-mail template with the e-mail address of the target addressed recipient; preloading into the memory a separate blind forward field of the e-mail template with the e-mail address of a forward recipient; whereby on causing the e-mail thus preloaded to be sent via the input output device, the contents of the e-mail template are transmitted by e-mail to a receiving processing device of the target addressed recipient and at substantially the same time and as part of the same e-mail transmission operation the contents of the e-mail template are transmitted by e-mail to a receiving processing device of the forward addressed recipient.

Preferably, prior to transmission of the e-mail template to the forward recipient a customised forward message field template is presented for insertion of a customised forward message prior to transmission for subsequent presentation to the forward recipient together with the contents of the email template.

Preferably, the identity of the target recipient is but the e-mail address of the target recipient is not transmitted to the forward addressed recipient.

Preferably, the identity of the target recipient is not transmitted to the forward addressed recipient.

Preferably, neither the e-mail address nor identity of the target recipient is transmitted to the forward addressed recipient.

In yet a further broad form of the invention, there is provided a method of transmission of an e-mail from a transmission e-mail server to a receiving e-mail server; said method comprising presenting an e-mail template to a user; said template including a target addressed recipient field and a separate blind forward address field; said user preloading the target addressed recipient field of an e-mail template with the e-mail address of the target addressed recipient; said user preloading the separate blind forward field of the e-mail template with the e-mail address of a forward recipient; said transmission e-mail server sending the contents of the e-mail template as a first target e-mail transmission to the receiving e-mail server of the blind forward recipient after first stripping the e-mail address of the target addressed recipient from the data comprising the blind forward e-mail transmission.

In yet a further broad form of the invention, there is provided a processing device which implements a method of transmission of an e-mail from a transmission e-mail server to a receiving e-mail server; the processing device including at least a processor in communication with a memory and input output device; said method comprising the processing device presenting an e-mail template to a user by means of the input output device; said template including a target addressed recipient field and a separate blind forward address field; said user preloading into the memory the target addressed recipient field of an e-mail template with the e-mail address of the target addressed recipient; said user preloading into the memory the separate blind forward field of the e-mail template with the e-mail address of a forward recipient; said transmission e-mail server sending the contents of the e-mail template as a first target e-mail transmission to the receiving e-mail server of the blind forward recipient after first stripping the e-mail address of the target addressed recipient from the data comprising the blind forward e-mail transmission.

In yet a further broad form of the invention, there is provided a method of preparing an e-mail for blind copying to a blind copy addressed recipient at the same time as preparing the e-mail for sending the e-mail to a target addressed recipient; said method comprising preloading a target recipient field of an e-mail template with the e-mail address of the target addressed recipient; preloading a separate blind copy field of the e-mail template with the e-mail address of a blind copy addressed recipient; whereby on causing the e-mail thus preloaded to be sent, the contents of the e-mail template are transmitted by e-mail to the target addressed recipient and at substantially the same time and as part of the same e-mail transmission operation the contents of the e-mail template are transmitted by e-mail to the blind copy addressed recipient; and wherein one or both of the e-mail address and identity of the target addressed recipient is not transmitted to the blind copy addressed recipient.

In yet a further broad form of the invention, there is provided a processing device which implements a method of preparing an e-mail for blind copying to a blind copy addressed recipient at the same time as preparing the e-mail for sending the e-mail to a target addressed recipient; the processing device at least a processor in communication with a memory and input output device; said method comprising preloading into the memory a target recipient field of an e-mail template with the e-mail address of the target addressed recipient; preloading into the memory a separate blind copy field of the e-mail template with the e-mail address of a blind copy addressed recipient; whereby on causing the e-mail thus preloaded to be sent via the input output device, the contents of the e-mail template are transmitted by e-mail to the target addressed recipient and at substantially the same time and as part of the same e-mail transmission operation the contents of the e-mail template are transmitted by e-mail by the input output device to the blind copy addressed recipient; and wherein one or both of the e-mail address and identity of the target addressed recipient is not transmitted to the blind copy addressed recipient.

Preferably, the e-mail address of the target recipient is not transmitted to the blind copy addressed recipient.

Preferably, the identity of the target recipient is not transmitted to the blind copy addressed recipient.

Preferably, neither the e-mail address nor identity of the target recipient is transmitted to the blind copy addressed recipient.

Preferably, the e-mail address of the target recipient is not made available for use.

Preferably, the e-mail address of the target recipient is not made available for use by the sending mail server.

Preferably, the e-mail address of the target recipient is not made available for use by the receiving mail server.

Preferably, the e-mail address of the target recipient is not made available for use by the mail application running on a digital platform.

Preferably, the digital platform is a device operated by the receiver of the e-mail.

Preferably, the digital platform is a device operated by the sender of the e-mail.

Preferably, the digital platform is a sending e-mail server.

Preferably, the digital platform is a receiving e-mail server.

Preferably, an e-mail to be sent is personalised.

Preferably, an e-mail to be sent is personalised by selection of the identity and/or e-mail address of a recipient.

Preferably, an e-mail to be sent is personalised by addition of message data unique to the individual addressed recipient.

Preferably, a reply e-mail to be sent is personalised.

Preferably, the reply e-mail to be sent is personalised by selection of the identity and/or e-mail address of a recipient.

Preferably, the reply e-mail to be sent is personalised by addition of message data unique to the individual addressed recipient.

In yet a further broad form of the invention, there is provided an email system incorporating a disable "reply to all" functionality; said system presenting an email preparation screen including options to "send" the contents of an email template and "reply to all" to an email previously received and displayed; the system permitting a user to invoke an email preparation template which includes at least a Sender field, a Cc field, and a Subject field; said email preparation screen further including a "disable reply to all" option which, if invoked by a user, disables the "reply to all" option on that screen for so long as that option remains invoked.

In yet a further broad form of the invention, there is provided a processing device which implements any of the above described above method steps.

In yet a further broad form of the invention, there is provided a non-transitory media having stored thereon code which, when executed by a processor, implements any of the above described method steps.

DETAILED DESCRIPTION OF INVENTION

Figure 1:
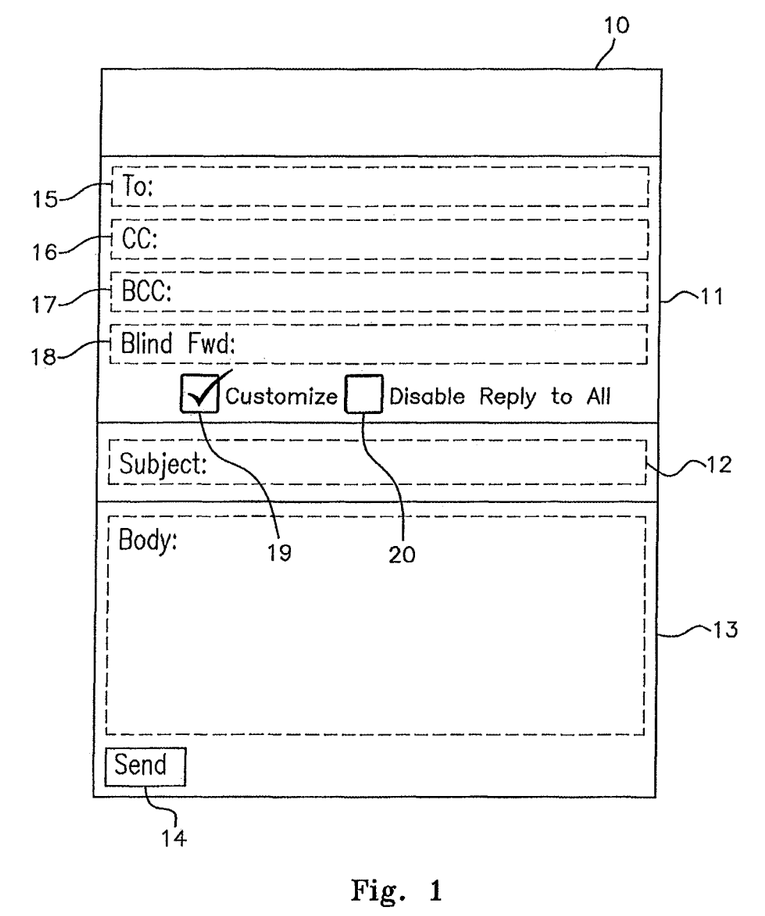
FIG. 1—User interface of example embodiment.

FIG. 1 discloses an example user interface for the example embodiment. The example email 10 includes a recipient selection area 11, an email subject area 12 and an email body text area 13 for use by the sender. When completed the users can send 14 the email.

The email recipient selection area has the traditional fields for selecting a "to" recipient 15, carbon copy recipients 16 and blind carbon copy recipients 17. The role and function of these fields is known in the art, In addition to the above there is the capability of selecting and specifying a Blind Forward recipient 18 or recipients.

When a person is identified as a blind forward recipient, that person receives a copy of the sent email in a format that would mimic the way a standard forwarded email would look with the exception that all email addresses except for the sender's address would be suppressed. This functionality, by design, disallows the recipient of a blind forward email from using the reply-to-all feature of standard email systems and inadvertently allowing all recipients to be alerted to the fact that the blind forward recipient received a copy.

The interface also allows the sender to select an additional two options 19 20 regarding the sending of their email. The customize selection box 19 allows a sender to treat the current email as a template from which to send customized versions of the same email to each recipient itemized in the recipient area 11 of the email.

Figure 2:
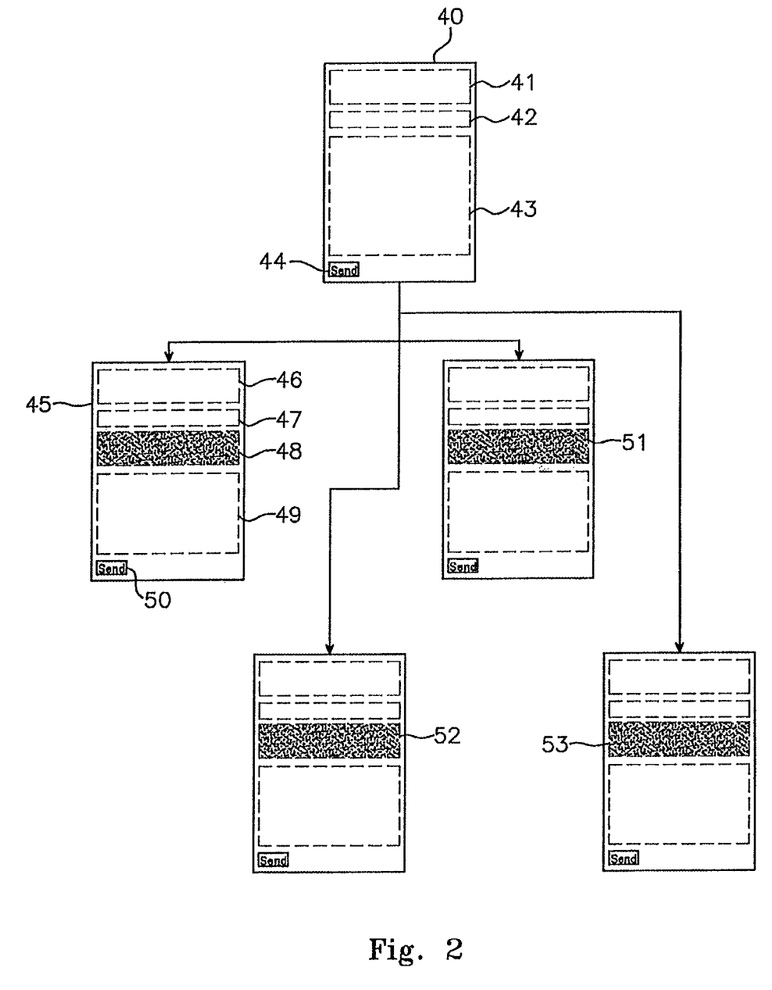
FIG. 2—Customize mode of the example embodiment.

When customize is selected 19 and the user hits the "send", or other special function, button 14 a succession of emails are presented as illustrated in FIG. 2 to the sender to allow them to customize the message or eventual sending on an individual basis to each recipient as itemized in the recipient area 11.

The function disclosed a disable reply to all 20 is an optional privacy feature that sends the email to every recipient itemized in the recipient area 11 but suppresses the publishing of each recipient's email address. While the recipient's name may still be listed in the received email, the fact that the other recipients' email addresses have been suppressed means that no recipients can accidently or inadvertently select reply-to-all from a standard email application and have their reply read by all the recipients of the original email that was sent.

Only the original sender can be replied to, no matter if the relying person uses the standard reply or reply-to-all feature of standard email applications, unless the recipient decides deliberately to add other recipients.

FIG. 2 discloses how the customize feature 19 of the example embodiment can be used to generate multiple individualized copies/blind forward emails of an email with limited effort in duplication.

A master email 40 is composed initially where all recipients are selected 41, a subject is defined 42 and main body text is compiled. If the customize feature is selected 19, then when the user selects the send button 44, a succession of emails are presented to the sender for customization before being finally sent.

In this example the body from the original template email 43 is moved down on the email page 49 to allow space at the top of the email 48 for the sender to add a customized message. A duplicate 46 of all recipients itemized in the original email 41 is sent with the email. The subject 47 is also duplicated from the original template email 42. When the email with customization 48 is sent, then an email for the next recipient from the master recipient list 41 is presented to the sender for customization 52 and sending.

Each additional recipient 51 53 itemised in the original recipient list 41 receives a customized email from the sender as the sender modifies and customizes the email and sends them.

The result is that a user can produce one email with a complete list of recipients, subject and body text, but can then customize and modify each message easily to cater to individual recipients.

Figure 3:
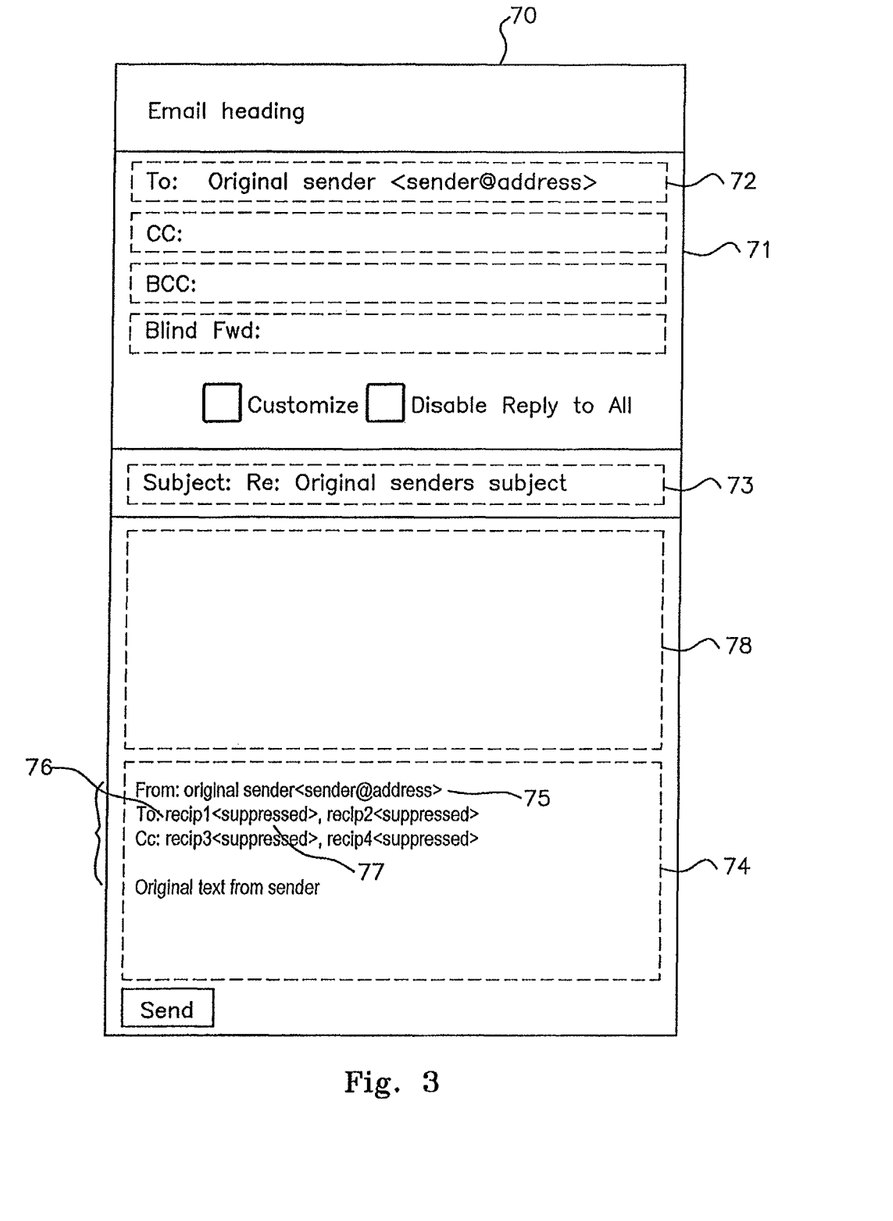
FIG. 3—Example embodiment with Reply to all disabled.

FIG. 3 shows the results of what happens when a recipient of an email decides to reply to an email sent by a person who has selected the Disable-reply-to-all feature before sending their email.

If the recipient who wishes to reply chooses to reply or reply-to-all, the result is the same. Because the email address of all recipients except the senders email address have been suppressed 77, a recipient can only reply to the original sender 72 75. While the body text copy 74 of the original email may include the name and email address 75 of the original sender, the email addresses of the other recipients of the email are suppressed 77 and marked as suppressed even though the name of the recipient may still appear 76 in the email.

As is known in the art the original senders subject and space to allow reply text is provided.

In the example embodiment, the customization of emails and the suppression of email addresses in emails sent is accomplished as a function of the email client being used by the sender.

The result is that emails can be sent with finite or fine-grained control over how people can reply to emails with the specific capability of reducing opportunities for people to inadvertently send replies to unintended recipients. The invention also allows for the customization of emails so that multiple recipients of the same email can receive personalized versions of the same email.

System Description

Figure 4:
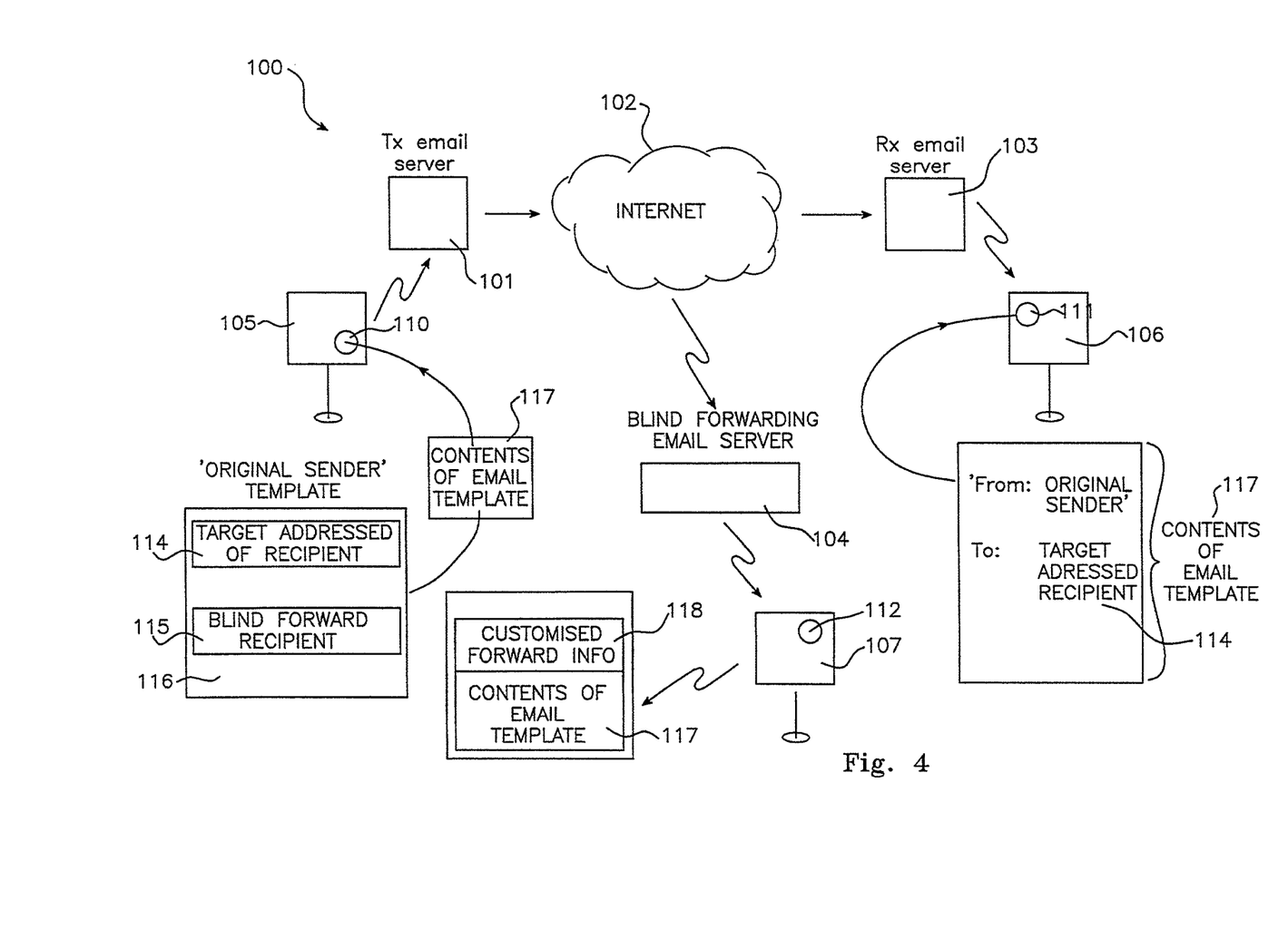
FIG. 4—is a block diagram of a blind forward operation in accordance with an embodiment of the invention.

With reference to FIG. 4 there is illustrated a block diagram of one example of an email system which can be utilised to give effect to embodiments described earlier in this specification with reference to FIGS. 1 to 3. The system 100 in this instance comprises at least one transmission email server which can transmit and receive emails communicated over the internet 102 to other servers including receiving email server 103 and blind forward email server 104. Users of the system 100 can communicate with the respective servers via way of a application 110, 111, 112 running on a digital device respectively 105, 106, 107. The system can be implemented currently using, for example, the Microsoft "Exchange" server system but is not limited to it. The system can be given effect through related communications systems such as instant messaging applications like WhatsApp and Skype.

In use, an original sender creates an email message utilising an original sender template 113 by populating fields such as the target addressed recipient field 114 and a blind forward recipient field 115 and a message 116 thereby to form contents of email template 117 which is transmitted via local application 110 to transmission email server 101. Transmission email server 101 causes contents of email template 117 to be received by receiving email server 103 for display on digital device 106 of the target addressed recipient 114 via application 111.

At substantially the same time transmitting email server 101 also causes contents of email template 117 to be transmitted via internet 102 to blind forward email server 104 for display on digital device 107 via application 112. In this instance the contents of email template 117 may optionally include customised forward information 118 if populated by the original sender in the original sender template 113 (refer earlier description particularly with reference to FIG. 2). With this arrangement even if "reply to all" functionality is enabled on application 111 of digital device 106 or on application 112 of digital device 107 the message sent by a reply or a reply to all function will in no instance include the sending of the email to the target addressed recipient 114.

As discussed elsewhere, the system 100 can include local applications which specifically include the ability to disable "reply to all" functionality—refer in particular FIG. 1 and its associated description.

This arrangement permits greater control for the users of the system when preparing emails for initial sending or preparing replies to emails received.

Alternative Embodiments

The example embodiment uses a client application to produce customized emails; blind forward emails and email address suppression functionalities.

An alternative embodiment could use server side capabilities such as used in web email systems or any combination of client and server side functionality to achieve the same results.

The example embodiment shows the customise and Disable-reply-to-all functions as applying to all the recipients of an email.

An alternative embodiment could allow any combination of customization and reply suppression ranging from applying one or both to all recipients down to an individual choosing unique options for each individual recipient.

What is claimed is:

1. A method of preparing an e-mail for forwarding to a blind forward addressed recipient at the same time as preparing the e-mail for sending to a target addressed recipient, said method comprising:
   preloading, by a processor of a transmission e-mail server, into a memory a target recipient field of an e-mail template with an e-mail address of the target addressed recipient; and
   preloading, by the processor, into the memory a separate blind forward field of the e-mail template with an e-mail address of the blind forward addressed recipient, wherein:
   when the processor causes the e-mail thus preloaded to be transmitted, contents of the e-mail template are transmitted by the transmission e-mail server to the target addressed recipient and at the same time and as part of the same e-mail transmission operation the contents of the e-mail template are forwarded to the blind forward addressed recipient,
   the e-mail address of the target addressed recipient is not made available for use,
   neither the e-mail address of the blind forward addressed recipient nor an identity of the blind forward addressed recipient is transmitted to the target addressed recipient at the time of transmission, and
   the identity of the target addressed recipient is transmitted to the blind forward addressed recipient, the e-mail address of the target addressed recipient is not transmitted to the blind forward addressed recipient, and a reply to the e-mail by the blind forward addressed recipient to the target addressed recipient is disabled; and
   displaying a Graphical User Interface (GUI) of a device of the blind forward addressed recipient prior to transmission of the e-mail template to the blind forward addressed recipient, wherein the GUI includes a customized message field template for insertion of a customized forward message prior to transmission for subsequent presentation to the blind forward addressed recipient together with the contents of the email template.

2. The method of claim 1, wherein the e-mail address of the target addressed recipient is not made available for use by a sending e-mail server.

3. The method of claim 1, wherein the e-mail address of the target addressed recipient is not made available for use by a receiving e-mail server.

4. The method of claim 1, wherein the e-mail address of the target addressed recipient is not made available for use by a mail application running on a digital platform.

5. The method of claim 4, wherein the digital platform is a device operated by a receiver of the e-mail.

6. The method of claim 4, wherein the digital platform is a device operated by a sender of the e-mail.

7. The method of claim 4, wherein the digital platform is a sending e-mail server.

8. The method of claim 4, wherein the digital platform is a receiving e-mail server.

9. The method of claim 8, wherein a reply e-mail to be sent is personalized by addition of message data unique to an individual addressed recipient.

10. A method of transmission of an e-mail from a transmission e-mail server, said method comprising:
    displaying a graphical user interface (GUI) including an e-mail template on a user device, wherein the e-mail template includes a target addressed recipient field and a separate blind forward address field, and the GUI includes a customized message field template for insertion of a customized forward message prior to transmission for subsequent presentation to the blind forward addressed recipient together with the contents of the email template;
    providing said user an ability to load the target addressed recipient field of the e-mail template with an e-mail address of a target addressed recipient, wherein the e-mail address of the target addressed recipient is not made available for use;
    providing said user an ability to load the separate blind forward address field of the e-mail template with an e-mail address of a blind forward addressed recipient, wherein neither the e-mail address of the blind forward addressed recipient nor an identity of the blind forward addressed recipient is transmitted to the target addressed recipient at the time of transmission; and
    sending, by said transmission e-mail server, contents of the e-mail template as a first target e-mail transmission to a receiving e-mail server of the blind forward addressed recipient, after first stripping the e-mail address of the target addressed recipient from data comprising the e-mail transmission to the blind forward addressed recipient at the time of transmission, so that a reply by the blind forward addressed recipient to the target addressed recipient is disabled.

11. A method of preparing an e-mail for blind copying to a blind forward addressed recipient at the same time as preparing the e-mail for sending to a target addressed recipient, said method comprising:

preloading, by a processor, into a memory a target recipient field of an e-mail template with an e-mail address of the target addressed recipient; and preloading, by a processor, into a memory a separate blind copy field of the e-mail template with an e-mail address of a blind forward addressed recipient, wherein: when the processor causes the e-mail thus preloaded to be sent, and contents of the e-mail template are transmitted by e-mail to the target addressed recipient, and at the same time and as part of the same e-mail transmission operation, the contents of the e-mail template are transmitted by e-mail to the blind forward addressed recipient, the e-mail address of the target addressed recipient is not made available for use, neither the e-mail address of the blind forward addressed recipient nor an identity of the blind forward addressed recipient is transmitted to the target addressed recipient at the time of transmission, and the identity of the target addressed recipient is transmitted to the blind forward addressed recipient, the e-mail address of the target addressed recipient is not transmitted to the blind forward addressed recipient, and a reply to the e-mail by the blind forward addressed recipient to the target addressed recipient is disabled; and displaying a Graphical User Interface (GUI) of a device of the blind forward addressed recipient prior to transmission of the e-mail template to the blind forward addressed recipient, wherein the GUI includes a customized message field template for insertion of a customized forward message prior to transmission for subsequent presentation to the blind forward addressed recipient together with the contents of the email template.

12. A system for preparing an e-mail for forwarding to a blind forward addressed recipient at the same time as preparing the e-mail for sending to a target addressed recipient, said system comprising:

a transmission e-mail server;
a receiving e-mail server; and
a forwarding e-mail server; wherein the transmission e-mail server comprises a processor and a memory, wherein the memory comprises machine-readable instructions that cause the processor of the transmission e-mail server to:

(i) receive at the same time from a user device a first e-mail having first contents directed to the target addressed recipient, and a second e-mail having the first contents directed to the blind forward addressed recipient;

(ii) send at the same time the first e-mail to the receiving e-mail server and the second e-mail to the forwarding e-mail server;

(iii) wherein neither the e-mail address of the blind forward addressed recipient nor an identity of the blind forward addressed recipient is transmitted to the target addressed recipient at the time of initial transmission, and the e-mail address of the target addressed recipient is not made available for use;

(iv) cause the second e-mail to be sent to the blind forward addressed recipient and to not transmit an e-mail address of the target addressed recipient to the blind forward addressed recipient, so that a reply to the second e-mail by the blind forward addressed recipient to the target addressed recipient is disabled; and (v) display a Graphical User Interface (GUI) of a device of the blind forward addressed recipient prior to transmission of the e-mail template to the blind forward addressed recipient, wherein the GUI includes a customized message field template for insertion of a customized forward message prior to transmission for subsequent presentation to the blind forward addressed recipient together with the contents of the email template.

* * * * *